United States Patent [19]
Farkas et al.

[11] Patent Number: 6,054,533
[45] Date of Patent: Apr. 25, 2000

[54] COMPATIBILIZED BLENDS OF A THERMOPLASTIC ELASTOMER AND A POLYOLEFIN

[75] Inventors: Julius Farkas, North Ridgeville; Charles Patrick Jacobs, Elyria; Dennis Lee Lawson, Brunswick; Gary Franklin Wilson, Grafton, all of Ohio

[73] Assignee: The B.F. Goodrich Company, Richfield, Ohio

[21] Appl. No.: 08/951,013

[22] Filed: Oct. 15, 1997

[51] Int. Cl.[7] .............................. C08L 23/12; C08L 75/04
[52] U.S. Cl. ............................ 525/90; 525/89; 525/92 A; 525/125; 525/128; 525/130
[58] Field of Search .............................. 525/89, 90, 92 A, 525/125, 128, 130

[56] References Cited

U.S. PATENT DOCUMENTS

| | | | |
|---|---|---|---|
| 5,242,977 | 9/1993 | Franke | 525/125 |
| 5,358,981 | 10/1994 | Southwick . | |
| 5,393,843 | 2/1995 | Handlin, Jr. et al. . | |
| 5,405,911 | 4/1995 | Handlin, Jr. et al. . | |
| 5,486,570 | 1/1996 | St. Clair . | |
| 5,576,388 | 11/1996 | St. Clair et al. . | |
| 5,589,543 | 12/1996 | Yokelson et al. . | |
| 5,605,961 | 2/1997 | Lee et al. . | |

FOREIGN PATENT DOCUMENTS

| | | |
|---|---|---|
| 0131714 | 1/1985 | European Pat. Off. . |
| 657502 | 6/1995 | European Pat. Off. . |
| 0641828 | 8/1995 | European Pat. Off. . |
| 0732 349 A2 | 9/1996 | European Pat. Off. . |
| 4-25566 | 1/1992 | Japan . |
| WO 97/00901 | 1/1997 | WIPO . |

*Primary Examiner*—David Buttner
*Attorney, Agent, or Firm*—David P. Dureska; Daniel J. Hudak

[57] ABSTRACT

A compatibilized blend of a thermoplastic elastomer and a polyolefin. The compatibilizer is a thermoplastic polyurethane formed by the reaction of a substantially hydrocarbon intermediate such as a polybutadiene polyol, a diisocyanate such as MDI, and an amine or diol chain extender such as neopentyl glycol. The compatibilizer has high amounts of soft segments therein and imparts improved properties to blends of a thermoplastic elastomer and polyolefin such as good impact resistance, good tensile strength, good tear resistance, and good delamination resistance.

28 Claims, No Drawings

ABSTRACT

COMPATIBILIZED BLENDS OF A THERMOPLASTIC ELASTOMER AND A POLYOLEFIN

FIELD OF INVENTION

The present invention relates to compatibilizing blends of a polyolefin such as polypropylene with a thermoplastic elastomer such as a urethane polymer, e.g., made from a polyester or polyether polyol. The present invention also relates to a polyurethane compatibilizing agent for the blend which agent contains a majority amount of soft segments therein and which is derived from a substantially hydrocarbon intermediate such as a polydiene diol.

BACKGROUND OF THE INVENTION

Heretofore, various types of polyurethanes have been made from polyester or polyether polyols. Such thermoplastic polyurethanes are generally incompatible with polyolefins such as polypropylene.

U.S. Pat. No. 5,589,543, to Yokelson et al., relates to hydrophobic polyurethane elastomers containing a linear soft segment without pendant chain-branched groups, wherein said polyurethane elastomer has a glass transition temperature (Tg) of less than −70° C., and a moisture uptake of less than 1.0 wt. % after 24 hours of immersion in water at 70° C., and wherein said polyurethane elastomer comprises at least one repeat unit containing said linear soft segment, which soft segment comprises a moiety derived from a polyol which is an unsaturated hydrocarbon polyol.

PCT International Application Publication No. WO 97/00901, to Cenens, relates to a thermoplastic polyurethane formed from a polydiene diol, preferably a hydrogenated polybutadiene diol, having from 1.6 to 2 terminal hydroxyl groups per molecule and a number average molecular weight between 500 and 20,000, an isocyanate having two isocyanate groups per molecule, and optionally a chain extender having two hydroxyl groups per molecule. The thermoplastic polyurethane composition is prepared by a prepolymer method, preferably a solventless prepolymer method using a branched chain extender.

European Patent Application No. EP 0 732 349, to Kaufhold, relates to a thermoplastic polyurethane resin prepared by reacting an isocyanate, a polyol, a reactive polyolefin, and a chain extender. The resin is blended with polypropylene.

SUMMARY OF THE INVENTION

Polyolefins are blended with thermoplastic elastomers such as thermoplastic polyester elastomers, thermoplastic polyamide elastomers, or thermoplastic urethane polymers such as those derived from polyester and/or polyether polyols, through the use of a urethane compatibilizing agent. The compatibilizer is made by melt-polymerizing a substantially hydrocarbon intermediate such as that derived from various saturated or unsaturated polydienes, for example polybutadiene, a diisocyanate, and desirably chain extender. The amount of the hydrocarbon intermediate is large such that the compatibilizer contains at least 55 percent by weight of soft segments therein.

DETAILED DESCRIPTION OF THE INVENTION

The compatibilizer is a thermoplastic polyurethane derived from the reaction of a substantially hydrocarbon intermediate, a diisocyanate, and a chain extender. The hydrocarbon intermediate is a low molecular weight compound or a polymer having hydroxyl (preferred), amine, or carboxylic acid terminal groups thereon. When the substantially hydrocarbon intermediate is not solely a hydrocarbon but, e.g., a polyester, the number of consecutive polymer backbone carbon atoms between a non-carbon atom such as oxygen, is large, i.e., at least 20 carbon atoms, desirably at least 30 carbon atoms, and preferably at least 45 carbon atoms. An example of such a substantially hydrocarbon intermediate, i.e., a long chain polyester polyol Priplast 3197 from Unichema. Priplast 3197 is a dimerdiol dimerate prepared from dimerdiol Pripol 2033 containing at least 36 carbon atoms and a dimer acid containing about 44 carbon atoms. A suitable low molecular weight hydrocarbon intermediate is Pripol 2033 from Unichema, a 36 carbon atom dimerdiol. However, the intermediate is preferably solely a hydrocarbon intermediate derived from one or more dienes having a total of from 4 to 8 carbon atoms, such as butadiene, isoprene, and the like, with butadiene being preferred. The number average molecular weight of the hydrocarbon intermediate is generally from about 300 or 500 to about 10,000, desirably from about 1,000 to about 7,500, and preferably from about 2,000 to about 5,000. The hydrocarbon intermediate can be unsaturated but preferably is substantially hydrogenated such that at least 80 percent, desirably 90 or 95 percent, and preferably at least 98 percent, 99 percent, and even 100 percent of the carbon-carbon double bonds in the intermediate are saturated. Hydrogenation may be carried out according to any conventional process or manner such as set forth in U.S. Pat. Nos. 5,393,843 or 5,405,911, hereby fully incorporated by reference. When butadiene is utilized, the microstructure of the resulting polymer can be largely 1,2 structure or 1,4 structure (e.g., 15 to 85%) with a similar amount (e.g., 35 to 65%) of each generally being preferred. Examples of hydrocarbon polyols derived from butadiene include the following:

| Identification | Supplier | Description |
| --- | --- | --- |
| Kraton Liquid L2203 | Shell | Hydroxyl-terminated polybutadiene, hydrogenated. Approximate microstructure: 55% 1,2; 45% 1,4. |
| Polytail H | Mitsubishi | Hydroxyl-terminated polybutadiene, hydrogenated. Approximate microstructure: 21% 1,2; 79% 1,4. |
| Polytail HA | Mitsubishi | Hydroxyl-terminated polybutadiene, hydrogenated. Approximate microstructure: 83% 1,2; 17% 1,4. |
| Krasol LBH | Kaucuk AG | Hydroxyl-terminated polybutadiene. Approximate microstructure: 65% 1,2; 35% 1,4. |
| Liquiflex H | Petroflex | Hydroxyl-terminated polybutadiene. Approximate microstructure: 22% 1,2; 78% 1,4. |

Kraton L2203 is preferred in the present invention.

The term "polyol" with respect to a substantially hydrocarbon polyol intermediate is to be understood to mean that while preferably the hydrocarbon has two functional hydroxyl end groups, the same can generally range from about 1.8 to about 2.2 end groups per molecule.

The isocyanates utilized in the present invention are preferably diisocyanates and include aliphatic, cycloaliphatic, aromatic, alkyl-substituted aromatic diisocyanates and the like, as well as mixtures thereof. Such diisocyanates generally contain a total of from abut 2 to about 30 carbon atoms, and representative examples include ethylene diisocyanate; toluene diisocyanate; methylene bis- (4-phenylisocyanate), that is, MDI; isophorone diisocyanate; hexamethylene diisocyanate; naphthalene diisocyanate; cyclohexylene diisocyanate; diphenylmethane-3,3' dimethoxy-4,4'-diisocyanate, meta-tetramethylxylene diisocyanate (m-TMXD1), paratetramethylxylene diisocyanate (p-TMXD1), m-xylylene diisocyanate (XDI), decane-1,10-diisocyanate, dicyclohexylmethane-4,4'-diisocyanate, as well as combinations thereof, and the like, with MDI being preferred. It is to be understood that isomers of the various diisocyanate can also be used.

The chain extenders can be either diamines, alkanolamines, or preferably diols containing a total of from 2 to 15 carbon atoms. Examples of chain extenders include ethanolamine, ethylene diamine, ethylene glycol, 1,3-propane diol, 2,3- or 1,4-butane diol, 1,5-pentane diol, 1,6-hexane diol, hydroquinone bis(2-hydroxyethyl)ether, 1,4-cyclohexanediol, diethylene glycol, dipropylene glycol, 1,4-cyclohexanedimethanol, and the like, with 2-butyl-2-ethyl-1,3-propane diol (BEPD) being preferred, and neopentyl glycol being highly preferred. The amount of the chain extender can be zero (i.e., none) but desirably is from about 3 to about 30 percent by weight and preferably from about 6 to about 25 percent by weight based upon the total weight of chain extender and the substantially hydrocarbon intermediate utilized in the formation of the thermoplastic polyurethane compatibilizer. The amount of the chain extender and intermediate utilized, whether they contain hydroxyl groups, amine groups, etc., is generally an equivalent excess to the amount of diisocyanate utilized. That is, the molar ratio of the diisocyanate to hydrocarbon intermediate and chain extender is generally from about 0.8 to about 1.05 and desirably from about 0.9 to about 1.01.

It is a desirable aspect of the present invention to make the thermoplastic polyurethane compatibilizer by either the random polymerization method wherein the substantially hydrocarbon intermediate, the diisocyanate and the chain extender are all added together at once and polymerized, or by the prepolymer method. The prepolymer method is preferred where the chain extender is not soluble in the intermediate as generally is the case. Thus, the prepolymer method is generally preferred wherein the isocyanate component is first partially or fully reacted with the hydrocarbon intermediate or polyol to form an isocyanate-terminated prepolymer. The same can be achieved by melt-polymerization. The partially or fully formed prepolymer can then be subsequently reacted with the chain extender.

The polymerization of the reactants forming the thermoplastic compatibilizer of the present invention can generally be carried out by melt-polymerization in a substantially solvent-free and preferably completely solvent-free environment. The hydrocarbon intermediate is heated to a temperature of from about 80° C. to about 160° C. The diisocyanate, such as MDI, is added and prepolymer formation commences. After a short period of time, for example a couple or several minutes whereby partial or total prepolymers have been formed, the chain extender is added and the reaction carried out to completion. This method allows ready reaction of the insoluble chain extender such as neopentyl glycol with the diisocyanate inasmuch as neopentyl glycol does not dissolve in the substantially hydrocarbon intermediate.

The formation of the compatibilizer is generally carried out in the presence of small amounts of catalysts such as organo tin catalysts, e.g., stannous octoate, a preferred catalyst; stannous oleate; dibutyl tin dioctoate; dibutyl tin dilaurate; and the like. Other organic catalysts include iron acetylacetonate, magnesium acetylacetonate, and the like. Tertiary organic amine catalysts, such as triethylamine, triethylene diamine, and the like, can also be utilized. The amount of catalyst is generally very small, from about 25 to about 1,000 parts per million and desirably from about 40 to about 500 PPM by weight based upon the total weight of the reactants.

Although various additives and fillers can be utilized as known to the art and to the literature, such as pigments, lubricants, stabilizers, antioxidants, anti-static agents, fire retardants, etc., the same are generally not utilized in the preparation of the compatibilizer.

The thermoplastic polyurethane compatibilizer of the present invention has soft segments as well as hard segments. The soft segments are generally defined as being solely the hydrocarbon portion of the intermediate. This is generally the entire portion of the hydrocarbon intermediate including the functional (e.g. hydroxyl) end groups. The hard segments are defined as everything else, e.g., the reaction of the intermediate terminal group with the diisocyanate and the reaction of the chain extender with the diisocyanate. The compatibilizers of the present invention desirably have high amounts of soft segments such as at least about 25 or 35 percent by weight, desirably from about 45 to about 90 percent by weight, and preferably from about 60 to about 80 percent by weight based upon the total weight of the thermoplastic polyurethane compatibilizer excluding any additives, fillers, etc.

The physical blends of the thermoplastic elastomers and polyolefins of the present invention are compatibilized by using small amounts of the above-noted compatibilizing agent. Desirably thermoplastic elastomers include thermoplastic polyester elastomers, thermoplastic polyamide elastomers often referred to as polyether block amide thermoplastic elastomers, and thermoplastic urethane elastomers, hereinafter referred to as a thermoplastic urethane polymer. The thermoplastic urethane polymer utilized can generally be any conventional type known to the art or literature. Generally such urethane polymers are formed or derived from polyester or polyether intermediates. The polyester intermediates can be linear or branched and are produced by the esterification reaction of one or more glycols with one or more dicarboxylic acids or anhydrides, or by transesterification, i.e., the reaction of one or more glycols with esters of dicarboxylic acids. Mole ratios in generally an excess of one mole of glycol to acid are preferred so as to obtain intermediates having a preponderance of terminal hydroxyl groups. The dicarboxylic acids can be aliphatic, cycloaliphatic, aromatic, or combinations thereof having a total of from 4 to about 15 to 20 carbon atoms and include succinic, glutaric, adipic, pimelic, suberic, azelaic, sebacic, dodecanoic, isophthalic, terephthalic, cyclohexane dicarboxylic, and the like. Anhydrides of the above dicarboxylic acids, such as phthalic anhydride, tetrahydrophthalic anhydride, or the like and mixtures thereof can also be utilized. The ester forming glycols can be aliphatic, aromatic, or combinations thereof, have a total of from 2 to 12 carbon atoms. Examples include: ethylene glycol, propylene-1,2-glycol, 1,3-propanediol, butylene-1,3-glycol, 1,4-butanediol, 1,5-pentanediol, 1,6-hexanediol, 2,2-dimethylpropane-1,3-diol, 1,4-cyclohexanedimethanol, decamethylene glycol, dodecamethylene glycol, hydroquinone bis(2-hydroxyethyl)ether; 2-methyl-1,3-propanediol, 3-methyl-1,5-pentanediol, and mixtures thereof.

Any suitable diisocyanate can be utilized as well as any conventional chain extender with the above-noted polyester intermediate to form the thermoplastic urethane polymer which is blended with the polyolefin. Suitable diisocyanates include the above-noted diisocyanates set forth with regard to the compatibilizing agent and include MDI, toluene diisocyanate, isophorone diisocyanate, and the like, with MDI being preferred. The chain extenders are generally diols having a molecular weight of 500 less and thus include the chain extenders set forth hereinabove with regard to the formation of the compatibilizing agent. Desirable chain extenders include 1,4-butane diol, and the like.

The preparation of the above-known thermoplastic polyesterurethane polymers are well known to the art and to the literature. Generally, a polyester intermediate with one or more chain extenders are blended at a temperature of from about 50 to about 100° C. and then heated to a temperature of about 100 to about 170° C. Diisocyanate or a mixture thereof is heated to approximately the same temperature and then mixed with the blend. Since the reaction is exothermic, the temperature will increase from about 200° C. to about 270° C. During the polymerization of the thermoplastic urethane polymer, various polyurethane catalysts can be utilized such as those noted hereinabove with regard to the formation of the compatibilizing agent, and the same is hereby fully incorporated by reference. Examples of suitable urethanes derived from polyester intermediates are the various Estane® thermoplastic polyurethanes manufactured by The BFGoodrich Company.

The hydroxyl terminated polyether intermediates can be polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide, or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol), poly(propylene glycol), poly-(propylene-ethylene glycol), poly (tetramethylene ether glycol) (PTMEG), copolyether produced from tetrahydrofuran (THF) and ethylene oxide or THF and propylene oxide, glycerol adduct comprising trimethylolpropane reacted with propylene oxide, pentaerythritol adduct comprising pentaerythritol reacted with propylene oxide, and similar hydroxyl functional polyethers or mixtures thereof. Polyether polyols further include polyamide adducts of an alkylene oxide and can include, for example, ethylenediamine adduct comprising the reaction product of ethylenediamine and propylene oxide, diethylenetriamine adduct comprising the reaction product of ethylenediamine and propylene oxide, and similar polyamide type polyether polyols.

The above-noted polyether intermediates are reacted with conventional and known diisocyanates as well as chain extenders such as those set forth hereinabove with regard to the formation of a thermoplastic urethane polymer derived from a polyester intermediate and thus the same is fully incorporated by reference. Rather than to repeat the types of diisocyanates and chain extenders, it is merely noted that MDI is the preferred diisocyanate and that 1,4-butane diol is the preferred chain extender. The preparation of the thermoplastic urethane polymer derived from a polyether intermediate is the same as set forth with regard to those derived from a polyester intermediate set forth hereinabove and the same is hereby fully incorporated by reference. Examples of urethane polymers derived from an ether intermediate include the various Estane® thermoplastic polyurethanes and the various Stat-Rite™ static dissipative polymers manufactured by The BFGoodrich Company.

The thermoplastic polyester elastomers are multi-block copolymers which can be represented by generalized formula (—A—B—)$_n$. Polyester elastomers contain repeating high melting blocks which are capable of crystallization (hard segments) and amorphous blocks having a relatively low glass transition temperature (soft segments). Typically the hard segments are composed of multiple short chain ester units such as tetramethylene terephthalate units and the soft segments are derived from aliphatic polyether or polyester glycols having from 2 to about 20 carbon atoms. At useful service temperatures, the polyester elastomers resist deformation because of the presence of a network of microcrystallites formed by partial crystallization of hard segments. The microcrystallites function as physical crosslinks. At processing temperatures, the crystallites melt to yield a polymer melt which after shaping by molding, for example, retains its form upon cooling due to re-crystallization of the hard segments. As in the case of the polyurethanes, a variety of starting materials can be used for the preparation of polyester elastomers. By varying the ratio of hard to soft segments polyesters ranging from soft elastomers to relatively hard elastoplastics can be obtained.

Copolyesters derived from terephthalic acid, tetramethylene glycol, and poly(tetramethyleneoxide) glycol are desired. Such compositions contain from about 30 percent to about 95 percent by weight of tetramethylene terephthalate units. Moreover, polymers in which a portion of the tetramethylene terephthalate units are replaced by tetramethylene isophthalate or tetramethylene phthalate were also desired. Such thermoplastic polyester elastomers exhibit good tear strength, elasticity, low temperature flexibility and strength at elevated temperatures. They also crystallize rapidly. These thermoplastic polyester elastomers are commercially available as Hytrel® polyester elastomers from DuPont. Such polyester elastomers are more fully described in U.S. Pat. Nos. 3,651,014; 3,763,109; and 3,755,146, which are hereby fully incorporated by reference.

The copolyesters are readily prepared by melt polymerization. An agitated mixture of dimethyl terephthalate, poly (tetramethylene oxide) glycol and excess tetramethylene glycol is heated in the presence of a titanate catalyst. Methanol resulting from ester exchange is removed by fractional distillation after which the temperature is raised to about 250° C. while the pressure is reduced to less than 133 Pa. Measurement of the viscosity of the reaction mass permits the course of the polymerization to be followed. Temperatures above 260° C. lead to excessive rates of degradation.

These and other thermoplastic polyester elastomers which are known to the literature and to the art can be utilized in the present invention. For example, the polyester elastomers can be utilized as set forth in "Thermoplastic Elastomers" by Legge, Holden, and Schroeder, Hanser publishers, New York, N.Y., 1987, which is hereby fully incorporated by reference.

The thermoplastic polyamide elastomers, e.g., polyether block amide thermoplastic elastomers can be synthesized by many different methods using different linkages between the polyether and polyamide blocks. For example, amide linkages can be obtained by the reaction of dicarboxylic polyether blocks with diamine polyether blocks or diamine polyamide blocks with dicarboxylic polyether blocks in the molten state, see French Patent No. 1,603,901; Japanese patent 19,846R; U.S. Pat. No. 3,454,534; and United Kingdom patent 1,108,812, which are hereby fully incorporated by reference. Urethane linkages can be obtained by the reaction of poly (oxyethylene) αω-bischloroformate with adipoyl chloride and piperazine in solution, see United Kingdom patent 1,098,475, hereby fully incorporated by reference. The reaction of poly(oxethylene) diisocyanate with a diamine aromatic polyamide to produce polyamide polyether block copolymers with urea linkages, see Japanese patent 24,285Q, hereby fully incorporated by reference. Polyether-amide block copolymers having an ester linkage can be obtained by the melt polymerization of a dicarboxylic polyamide and a polyether diol. For example, the reaction of a dicarboxylic acid polyamide based on caprolactam and poly(oxyethylene) dihydroxy at 250° C. with paratoluene sulfonic acid as a catalyst, see United Kingdom patent 1,110,394, hereby fully incorporated by reference. Another route is the reaction of a 36 carbon atom fatty acid dimer and a diamine with a polyoxyethylene dihydroxy without catalyst at 250° C., see French patent 2,178,205, which is hereby fully incorporated by reference.

Generally, the polyether block amide thermoplastic elastomer is obtained by the molten state polycondensation reaction of polyether diol blocks and dicarboxylic polyamide blocks. The dicarboxylic polyamide blocks are produced by the reaction of polyamide precursors with a dicarboxylic acid chain limiter. The reaction is achieved at high temperature (higher than 230° C.) and generally under pressure (up to 25 bars). The molecular weight of the polyamide block is controlled by the amount of chain limiter. The polyamide precursors can be selected from the following:

amino acids (aminoundecanoic acid, aminododecanoic acid)

lactams (caprolactam, Lauryllactam)

dicarboxylic acids (adipic acid, azelaic acid, dodecanedioic acid)

diamines (hexamethylene diamine, dodecamethylene diamine).

Dihydroxy polyether blocks are produced by two different reactions:

anionic polymerization of ethylene oxide and propylene oxide for polyoxyethylene dihydroxy and polyoxypropylene dihydroxy cationic polymerization of tetrahydrofuran for polyoxytetramethylene dihydroxy The block copolymerization is a polyesterification achieved at high temperature (230–280° C.) under vacuum (0.1 to 10 Torrs) and requires the use of an appropriate catalyst. The preparation of such thermoplastic polyether block amide thermoplastic elastomers is well known to the art and to the literature.

The weight average molecular weight of the various thermoplastic elastomers which are blended with the polyolefins is generally from about 20,000 to about 500,000 and preferably from about 80,000 to about 300,000 as determined by gel permeation chromatography. The weight average molecular weight of the polyester or polyether intermediates with regard to the formation of the thermoplastic urethane polymer is generally from about 250 to about 5,000 and preferably from about 1,000 to about 4,000.

The polyolefins utilized in the blend are made from monomers having from 2 to 4 carbon atoms with examples including polyethylene (including high density polyethylene, low density polyethylene, linear low density polyethylene and the like), polybutylene and their copolymers, with polypropylene including atactic and syndiotactic polypropylene, as well as blends of polypropylene with elastomers, commonly referred to as TPO (thermoplastic polyolefins) being preferred. The weight average molecular weight of such polyolefins is generally from about 40,000 to about 2,000,000, and preferably from about 100,000 to about 1,500,000.

The amount of the thermoplastic elastomers utilized in forming the physical blend is generally from about 5 percent to about 95 percent by weight, and preferably from about 15 to about 60 percent by weight based upon the total weight of the thermoplastic elastomer and the polyolefin. The amount of the polyolefin utilized in the blend is a complementary amount.

The amount of the compatibilizing agent of the present invention utilized to form the compatibilized blend is unexpectedly a very low level. Naturally, the optimum amount will vary depending upon the type of thermoplastic elastomers, the type of particular polyolefin, and the like. Generally, the amount of compatibilizing agent is from about 0.25 to about 15 parts by weight and desirably from about 0.5 or 0.75 to about 6 or 10 parts by weight for every 100 parts by weight of the thermoplastic elastomer and the polyolefin blend.

The polyolefin and the thermoplastic elastomer are mixed or blended in a suitable manner along with the compatibilizing agent to achieve a compatibilized blend. The mixing can utilize conventional melt processing techniques and can either be batch or continuous such as through the use of a single or a twin screw extruder. The mixing temperature is generally above the melting point of the polyolefin, the thermoplastic elastomer and the compatibilizing agent. Such temperatures are generally from about 180° C. to about 240° C. The mixing time will naturally vary depending upon the amount of components blended together.

When compatibilized, the thermoplastic polyolefin blends have been found to have improved properties such as impact resistance, good tensile strength, low delamination, good tear resistance, low abrasion, and the like over noncompatibilized blends of the same two polymers as fully shown in the various examples.

The compatibilized blends of the present invention can be used wherever blends having the above-noted properties are desired, as in automotive components, for example rocker panels, body side moldings, quarter panels, and the like; in electronic component packaging items; in business machines such as housing and the like; and for auxiliary devices for the electronic industry.

The invention will be better understood by reference to the following examples which serve to illustrate but not limit the present invention.

SYNTHESES OF COMPATIBILIZERS

Polyurethanes were prepared by either the random melt polymerization method or the prepolymer method. In the random melt polymerization method, the polyol and chain extender are blended together at 100–150° C. Diphenylmethanediisocyanate (MDI) is heated separately to 100–150° C., then mixed with the blend. The reactants are vigorously mixed for 3–4 minutes. The polymer melt is discharged into a cooled, teflon-coated pan, cured at 70° C. for 1 week, then granulated. In the prepolymer method, the polyol is heated to 100–150° C. MDI is separately heated to 100–150° C., then mixed with the polyol and allowed to react for 1–2 minutes. The chain extender is added, and the reaction continues for an additional 1.5–3 minutes. The polymer melt is then treated as described above. The melt index values were obtained by ASTM-D-1238.

EXAMPLE 1

Pripol 2033 (150.0 g, MW 570) was heated to 100° C. with stirring. MDI (65.2 g), preheated to 100° C., was added. The mixture was allowed to react for 3 minutes.

EXAMPLE 2

Kraton Liquid™ HPVM-2203 (100.0 g, MW 3577), Pripol 2033 (100.0 g, MW 570), and stannous octoate (0.012 g) were heated to 100° C. with stirring. MDI (51.0 g), preheated to 100° C., was added. The mixture was allowed to react for 3 minutes.

EXAMPLE 3

Kraton Liquid™ HPVM-2203 (180.0 g, MW 3577) and stannous octoate (0.012 g) were heated to 120° C. with stirring. MDI (55.0 g), preheated to 120° C., was added. After 1.5 minutes of reaction, 20.0 g of neopentyl glycol (NPG) was added. The mixture was allowed to react for an additional 1.5 minutes. This polymerization was repeated. The granulated polymers were blended to give a polyurethane with melt index of 44 (190° C., 8700 g).

EXAMPLE 4

Kraton Liquid™ L-2203 (180.5 g, MW 3250) and stannous octoate (0.012) were heated to 120° C. with stirring. MDI (54.7 g), preheated to 120° C., was added. After 2 minutes of reaction, NPG (19.5 g) was added. The mixture was allowed to react for an additional 2 minutes. This polymerization was repeated nine times. The granulated polymers were blended to give a polyurethane with melt index of 6 (190° C., 8700 g).

EXAMPLE 5

Priplast 3197 (183.3 g, MW 2110), NPG (16.7 g), and stannous octoate (0.012 g) were heated to 120° C. with stirring. MDI (62.5 g), preheated to 120° C., was added. The mixture was allowed to react for 4 minutes. This polymerization was repeated. The granulated polymers were blended to give a polyurethane with melt index of 15 (190° C., 8700 g).

EXAMPLE 6

Kraton Liquid™ L-2203 (183.2 g, 3250 MW) and stannous octoate (0.012) were heated to 150° C. with stirring. MDI (60.2 g), preheated to 150° C., was added. After 2 minutes of reaction, 16.8 g of 1,4-butanediol (BDO) was added. The mixture was allowed to react for an additional 2 minutes, giving a polyurethane with melt index of 4 (210° C., 3800 g).

EXAMPLE 7

Kraton Liquid™ L-2203 (177.8 g, 3250 MW) and stannous octoate (0.012 g) were heated to 150° C. with stirring. MDI (60.1 g), preheated to 150° C., was added. After 2 minutes of reaction, 1,6-hexanediol (22.2 g) was added. The mixture was allowed to react for an additional 2 minutes, giving a polyurethane with melt index of 3 (210° C., 3800 g).

EXAMPLE 8

Kraton Liquid™ L-2203 (172.7 g, 3250 MW) and stannous octoate (0.012 g) were heated to 150° C. with stirring. MDI (60.1 g), preheated to 150° C., was added. After 2 minutes of reaction, 1,4-cyclohexanedimethanol (27.3 g) was added. The mixture was allowed to react for an additional 2 minutes, giving a polyurethane with melt index of 14 (210° C., 3800 g).

EXAMPLE 9

Kraton Liquid™ L-2203 (180.5 g, 3250 MW) and stannous octoate (0.012 g) were heated to 150° C. with stirring. MDI (60.1 g) preheated to 150° C., was added. After 2 minutes of reaction, 1,5-pentanediol (19.5 g) was added. The mixture was allowed to react for an additional 2 minutes, giving a polyurethane with melt index of 16 (210° C., 3800 g).

EXAMPLE 10

Kraton Liquid™ L-2203 (161.8 g, 3250 MW) and dibutyltin dilaurate (0.012 g) were heated to 150° C. with stirring. MDI (58.4 g), preheated to 150° C., was added. After 1 minute of reaction, hydroquinone bis(2-hydroxyethyl)ether (38.2 g) was added. The mixture was allowed to react for an additional 3 minutes, giving a polyurethane with melt index of 17 (210° C., 3800 g).

EXAMPLE 11

Krasol LBH (180.1 g 3522 MW) and stannous octoate (0.012) were heated to 150° C. with stirring. MDI (60.8 g), preheated to 150° C., was added. After 2 minutes of reaction, NPG (19.9 g) was added. The mixture was allowed to react for an additional 2 minutes, giving a polyurethane with melt index of 31 (175° C., 5000 g).

EXAMPLE 12

Polytail HA (183.4 g, 2197 MW) and stannous octoate (0.012 g) were heated to 150° C. with stirring. MDI (57.2 g), preheated to 150° C., was added. After 2 minutes of reaction, NPG (16.6 g) was added. The mixture was allowed to react for an additional 2 minutes, giving a polyurethane with melt index of 31 (175° C., 5000 g).

EXAMPLE 13

Liquiflex H (181.5 g, 2800 MW) and stannous octoate (0.012 g) were heated to 150° C. with stirring. MDI (50.2 g), preheated to 150° C., was added. After 2 minutes of reaction, NPG (18.5 g) was added. The mixture was allowed to react for an additional 2 minutes, giving a polyurethane with melt index of 37 (175° C., 5000 g).

EXAMPLE 14

Polytail H (134.8 g, 2252 MW) and stannous octoate (0.012) were heated to 120° C. with stirring. MDI (36.5 g), preheated to 120° C., was added. After 2 minutes of reaction, NPG (15.2 g) was added. The mixture was allowed to react for an additional 2 minutes, giving a polyurethane with melt index of 86 (210° C., 3800 g).

EXAMPLE 15

Polytail HA (183.4 g, 2197 MW) and stannous octoate (0.012 g) were heated to 150° C. with stirring. MDI (58.2 g), preheated to 150° C., was added. After 2 minutes of reaction, NPG (16.6 g) was added. The mixture was allowed to react for an additional 2 minutes, giving a polyurethane with melt index of 32 (190° C., 8700 g).

EXAMPLE 16

Krasol LBH (180.1 g, 3522 MW) and stannous octoate (0.012 g) were heated to 150° C. with stirring. MDI (61.9 g), preheated to 150° C., was added. After 2 minutes of reaction, NPG (19.9 g) was added. The mixture was allowed to react for an additional 2 minutes, giving a polyurethane with melt index of 25 (190° C., 8700 g).

EXAMPLE 17

Kraton Liquid™ L-2203 (169.5 g, 3250 MW), 2-butyl-2-ethyl-1,3-propanediol (BEPD, 30.5 g), and stannous octoate (0.012 g) were heated to 150° C. with stirring. MDI (59.5 g), preheated to 150° C., was added. The mixture was allowed to react for 4 minutes, giving a polyurethane with melt index of 112 (210° C., 3800 g).

EXAMPLE 18

Kraton Liquid™ L-2203 (180.5 g, 3250 MW), and stannous octoate (0.012 g) were heated to 120° C. with stirring. MDI (54.6 g), preheated to 120° C., was added. After 2 minutes of reaction, NPG (19.5) was added. The mixture was allowed to react for an additional 2 minutes, giving a polyurethane with melt index of 16 (190° C., 8700 g).

EXAMPLE 19

Kraton Liquid™ L-2203 (169.5 g, 3250 MW), BEPD (30.5 g), and stannous octoate (0.012 g) were heated to 150° C. with stirring. MDI (59.6 g), preheated to 150° C., was added. The mixture was allowed to react for 4 minutes, giving a polyurethane with melt index of 13 (190° C., 8700 g).

EXAMPLE 20

Kraton Liquid™ L-2203 (104.3 g, 3250 MW), Pripol 2033 (95.7 g, 570 MW), and stannous octoate (0.012 g) were heated to 120° C. with stirring. MDI (50.0 g), preheated to 120° C., was added. The mixture was allowed to react for 4 minutes, giving a polyurethane with melt index of 144 (190° C., 8700 g).

EXAMPLE 21

Priplast 3197 (166.4 g, 2110 MW), and stannous octoate (0.012 g) were heated to 120° C. with stirring. MDI (58.3 g), preheated to 120° C., was added. After 2 minutes of reaction, BDO (13.6 g) was added. The mixture was allowed to react for an additional 2 minutes, giving a polyurethane with melt index of <1 (190° C., 2160 g).

EXAMPLE 22

Priplast 3197 (165.0 g, 2110 MW), and stannous octoate (0.012 g) were heated to 120° C. with stirring. MDI (56.3 g), preheated to 120° C., was added. After 2 minutes of reaction, NPG (15.0) was added. The mixture was allowed to react for an additional 2 minutes, giving a polyurethane with melt index of 1 (190° C., 2160 g).

EXAMPLE 23

Priplast 3197 (160.6 g, 2110 MW) and stannous octoate (0.012 g) were heated to 120° C. with stirring. MDI (49.9 g), preheated to 120° C., was added. After 2 minutes of reaction, BEPD (19.4 g) was added. The mixture was allowed to react for an additional 2 minutes, giving a polyurethane with melt index of 30 (190° C., 2160 g).

EXAMPLE 24

Kraton Liquid™ L-2203 (173.6 g, 3250 MW) and stannous octoate (0.012 g) were heated to 120° C. with stirring. MDI (72.3 g), preheated to 120° C., was added. After 2 minutes of reaction, NPG (26.4 g) was added. The mixture was allowed to react for an additional 2 minutes. This polymerization was repeated four times. The granulated polymers were blended to give a polyurethane with melt index of 7 (190° C., 8700 g).

COMPARATIVE EXAMPLE 1

Polytetramethyleneadipate glycol (145.9 g, 2047 MW), Kraton Liquid™ L-2203 (19.8 g, 3250 MW), and BDO (15.2 g) were heated to 120° C. with stirring. MDI (60.4 g), preheated to 120° C., was added. The reaction was allowed to react for 3 minutes. The polymerization was repeated. The granulated polymers were blended to give a polyurethane with melt index of 19 (210° C., 3800 g).

POLYMER COMPOUNDING

Compound example numbers 25–51 and 58–66 were prepared using a Werner Pfleiderer ZSK-30 twin screw compounding extruder equipped with a strand die. In this method, a physical mixture of the components were fed into the extruder using a loss-in-weight feeder. The melt temperatures were generally 210–220° C. The extruded strands were chopped into uniform pellets. The pellets were processed by injection molding and/or film extrusion for property measurements. Compound example numbers 52–57 were prepared in a Brabender Prep Mixer. In this method, the components were charged into the mixer and mixed for 3 minutes after an initial static heating period of 5 minutes. The melt temperatures were generally 190–200° C. The blends obtained in this method were compression molded into sheets for property measurements.

TABLE I

|  | Ex 25 | Ex 26 | Ex 27 | Ex 28 | Ex 29 | Ex 30 | Ex 31 | Ex 32 | Ex 33 | Ex 34 | Ex 35 | Ex 36 |
|---|---|---|---|---|---|---|---|---|---|---|---|---|
| Polyester TPU (1) | 60 | 57 | 57 | 57 | 57 | — | — | 57 | 57 | 57 | 57 | 57 |
| Polyester TPU (2) | — | — | — | — | — | — | — | — | — | — | — | — |
| Polyether TPU (3) | — | — | — | — | — | 60 | 57 | — | — | — | — | — |
| Polyether TPU (4) | — | — | — | — | — | — | — | — | — | — | — | — |
| Polyether TPU (5) | — | — | — | — | — | — | — | — | — | — | — | — |
| Profax 6523 (6) | 40 | 38 | 38 | 38 | 38 | 40 | 38 | 38 | 38 | 38 | 38 | 38 |
| Rexene 41E2 (7) | — | — | — | — | — | — | — | — | — | — | — | — |
| Exxelor PO-1015 (8) | — | — | — | — | — | — | — | — | — | — | — | — |
| Bayon YM312 (9) | — | — | — | — | — | — | — | — | — | — | — | — |
| Hytrel 5544 (10) | — | — | — | — | — | — | — | — | — | — | — | — |
| Pebax MV 1074(11) | — | — | — | — | — | — | — | — | — | — | — | — |
| Example 1 | — | — | 5 | — | — | — | — | — | — | — | — | — |
| Example 2 | — | — | — | 5 | — | — | — | — | — | — | — | — |
| Example 3 | — | — | — | — | 5 | — | — | — | — | — | — | — |
| Example 4 | — | — | — | — | — | — | 5 | — | — | — | — | — |
| Example 5 | — | — | — | — | — | — | — | 5 | — | — | — | — |
| Example 6 | — | — | — | — | — | — | — | — | 5 | — | — | — |
| Example 7 | — | — | — | — | — | — | — | — | — | 5 | — | — |

TABLE I-continued

|  | Ex 25 | Ex 26 | Ex 27 | Ex 28 | Ex 29 | Ex 30 | Ex 31 | Ex 32 | Ex 33 | Ex 34 | Ex 35 | Ex 36 |
|---|---|---|---|---|---|---|---|---|---|---|---|---|
| Example 8 | — | — | — | — | — | — | — | — | — | — | 5 | — |
| Example 9 | — | — | — | — | — | — | — | — | — | — | — | 5 |
| Example 10 | — | — | — | — | — | — | — | — | — | — | — | — |
| Example 11 | — | — | — | — | — | — | — | — | — | — | — | — |
| Example 12 | — | — | — | — | — | — | — | — | — | — | — | — |
| Example 13 | — | — | — | — | — | — | — | — | — | — | — | — |
| Example 14 | — | — | — | — | — | — | — | — | — | — | — | — |
| Example 15 | — | — | — | — | — | — | — | — | — | — | — | — |
| Example 16 | — | — | — | — | — | — | — | — | — | — | — | — |
| Example 17 | — | — | — | — | — | — | — | — | — | — | — | — |
| Example 18 | — | — | — | — | — | — | — | — | — | — | — | — |
| Example 19 | — | — | — | — | — | — | — | — | — | — | — | — |
| Example 20 | — | — | — | — | — | — | — | — | — | — | — | — |
| Example 21 | — | — | — | — | — | — | — | — | — | — | — | — |
| Example 22 | — | — | — | — | — | — | — | — | — | — | — | — |
| Example 23 | — | — | — | — | — | — | — | — | — | — | — | — |
| Ex 24 | — | — | — | — | — | — | — | — | — | — | — | — |
| Comp Ex 1 | — | — | — | — | — | — | — | — | — | — | — | — |
| Kraton Liquid L-2203 | — | — | — | — | — | — | — | — | — | — | — | — |
| Properties | | | | | | | | | | | | |
| Izod, ft-lbs/inch | 5.4 | 8 | 9.1 | 13.5 | 22 | 2.3 | 8.5 | 19.6 | 20.3 | 20.2 | 17.8 | 16.9 |
| Flexural Modulus, psi | — | 95 K | 77 K | 65 K | 61 K | 53 K | 45 K | 64 K | 62 K | 67 K | 65 K | 64 K |
| Tensile Strength, psi | — | — | — | — | — | — | — | — | — | — | — | — |
| Elongation, % | — | — | — | — | — | — | — | 254 | 251 | 269 | 271 | 263 |
| Tear Resistance, ft-lbs/inch. | — | — | — | — | — | — | — | — | — | — | — | — |
| Taber Abrasion, g loss | — | — | — | — | — | — | — | — | — | — | — | — |
| Static decay +5,000 volts, sec. | — | — | — | — | — | — | — | — | — | — | — | — |
| Static decay −5,000 volts, sec. | — | — | — | — | — | — | — | — | — | — | — | — |
| Surface Resistivity, ohms | — | — | — | — | — | — | — | — | — | — | — | — |
| Surface (12) | — | del | del | sl del | v sl del | del | del | — | sl del | sl del | sl del | sl del |

(1) Poly(tetramethylene adipate) glycol with 59% hard segment.
(2) Poly(tetramethyleneadipate) glycol with 45% hard segment.
(3) Poly(tetramethylene ether) glycol with 62% hard segment.
(4) Poly(tetramethylene ether) glycol with 43% hard segment.
(5) Poly(oxyethylene)glycol with 36% hard segment.
(6) Polypropylene homopolymer.
(7) Polypropylene homopolymer.
(8) Maleic anhydride functionalized polypropylene.
(9) PEG-grafted acrylic copolymer.
(10) Copolyester
(11) Copolyamide
(12) Surfaces of molded plaques were judged for delamination (del); v (very), sl (slight), sev (severe).
The above properties were obtained by the following ASTM test methods.

| Property | Test Method |
|---|---|
| Izod Impact | ASTM D-256 |
| Flexural Modulus | ASTM D-790 |
| Tensile strength/elongation | ASTM D-412 |
| Tear Resistance | ASTM D-624 |
| Taber Abrasion | ASTM D-3389 |
| Surface Resistivity | ASTM D-257 |
| Static decay | FTMS 101C, Method 4046.1 |

TABLE II

|  | Ex 37 | Ex 38 | Ex 39 | Ex 40 | Ex 41 | Ex 42 | Ex 43 | Ex 44 | Ex 45 | Ex 46 | Ex 47 | Ex 48 |
|---|---|---|---|---|---|---|---|---|---|---|---|---|
| Polyester TPU (1) | 57 | 57 | 57 | 57 | 57 | 57 | 57 | 57 | 57 | — | — | — |
| Polyester TPU (2) | — | — | — | — | — | — | — | — | — | 60 | 57 | 57 |
| Polyether TPU (3) | — | — | — | — | — | — | — | — | — | — | — | — |
| Polyether TPU (4) | — | — | — | — | — | — | — | — | — | — | — | — |
| Polyether TPU (5) | 38 | 38 | 38 | 38 | 38 | 38 | 38 | 38 | 38 | — | — | — |
| Profax 6523 (6) | — | — | — | — | — | — | — | — | — | — | — | — |
| Rexene 41E2 (7) | — | — | — | — | — | — | — | — | — | 40 | 38 | 38 |
| Exxelor PO-1015 (8) | — | — | — | — | — | — | — | — | — | — | — | — |
| Bayon YM312 (9) | — | — | — | — | — | — | — | — | — | — | — | — |
| Hytrel 5544 (10) | — | — | — | — | — | — | — | — | — | — | — | — |
| Pebax MV 1074 (11) | — | — | — | — | — | — | — | — | — | — | — | — |
| Example 1 | — | — | — | — | — | — | — | — | — | — | — | — |
| Example 2 | — | — | — | — | — | — | — | — | — | — | — | — |

TABLE II-continued

|  | Ex 37 | Ex 38 | Ex 39 | Ex 40 | Ex 41 | Ex 42 | Ex 43 | Ex 44 | Ex 45 | Ex 46 | Ex 47 | Ex 48 |
|---|---|---|---|---|---|---|---|---|---|---|---|---|
| Example 3 | — | — | — | — | — | — | — | — | — | — | — | — |
| Example 4 | — | — | — | — | — | — | — | — | — | — | — | 5 |
| Example 5 | — | — | — | — | — | — | — | — | — | — | — | — |
| Example 6 | — | — | — | — | — | — | — | — | — | — | — | — |
| Example 7 | — | — | — | — | — | — | — | — | — | — | — | — |
| Example 8 | — | — | — | — | — | — | — | — | — | — | — | — |
| Example 9 | — | — | — | — | — | — | — | — | — | — | — | — |
| Example 10 | 5 | — | — | — | — | — | — | — | — | — | — | — |
| Example 11 | — | 5 | — | — | — | — | — | — | — | — | — | — |
| Example 12 | — | — | 5 | — | — | — | — | — | — | — | — | — |
| Example 13 | — | — | — | 5 | — | — | — | — | — | — | — | — |
| Example 14 | — | — | — | — | 5 | — | — | — | — | — | — | — |
| Example 15 | — | — | — | — | — | 5 | — | — | — | — | — | — |
| Example 16 | — | — | — | — | — | — | 5 | — | — | — | — | — |
| Example 17 | — | — | — | — | — | — | — | 5 | — | — | — | — |
| Example 18 | — | — | — | — | — | — | — | — | — | — | — | — |
| Example 19 | — | — | — | — | — | — | — | — | — | — | — | — |
| Example 20 | — | — | — | — | — | — | — | — | — | — | — | — |
| Example 21 | — | — | — | — | — | — | — | — | — | — | — | — |
| Example 22 | — | — | — | — | — | — | — | — | — | — | — | — |
| Example 23 | — | — | — | — | — | — | — | — | — | — | — | — |
| Example 24 | — | — | — | — | — | — | — | — | — | 5 | — | 5 | — |
| Comp Ex 1 | — | — | — | — | — | — | — | — | — | — | — | — |
| Kraton Liquid L-2203 | — | — | — | — | — | — | — | — | — | — | — | — |
| Properties |  |  |  |  |  |  |  |  |  |  |  |  |
| Izod, ft-lbs/inch | 19.8 | 10.2 | 14.1 | 11 | 10.6 | 10 | 9.2 | 17.1 | 17.9 | — | — | — |
| Flexural Modulus, psi | 61 K | 67 K | 70 K | 61 K | 92 K | 63 K | 83 K | 73 K | 67 K | — | — | — |
| Tensile Strength, psi | — | — | — | — | 4090 | 4720 | 4920 | 4790 | — | 4472 | 4829 | 6012 |
| Elongation, % | 263 | 266 | 263 | 264 | 258 | 270 | 277 | 266 | 249 | 404 | 439 | 501 |
| Tear Resistance, ft-lbs/inch | — | — | — | — | — | — | — | — | — | 597 | 545 | 717 |
| Taber Abrasion, g loss | — | — | — | — | — | — | — | — | — | 0.61 | 0.26 | 0.14 |
| Static decay +5,000 volts, sec. | — | — | — | — | — | — | — | — | — | — | — | — |
| Static decay −5,000 volts, sec. | — | — | — | — | — | — | — | — | — | — | — | — |
| Surface Resistivity, ohms | — | — | — | — | — | — | — | — | — | — | — | — |
| Surface (12) | v sl del | v sl del | v sl del | v sl del | — | — | — | — | sev del | — | — | — |

(1) Poly(tetramethylene adipate) glycol with 59% hard segment.
(2) Poly(tetramethylene adipate) glycol with 45% hard segment.
(3) Poly(tetramethylene ether) glycol with 62% hard segment.
(4) Poly(tetramethylene ether) glycol with 43% hard segment.
(5) Poly(oxyethylene) glycol with 36% hard segment.
(6) Polypropylene homopolymer.
(7) Polypropylene homopolymer.
(8) Maleic anhydride functionalized polypropylene.
(9) PEG-grafted acrylic copolymer.
(10) Copolyester
(11) Copolyamide
(12) Surfaces of molded plaques were judged for delamination (del); v (very), sl (slight), sev (severe).

TABLE III

|  | Ex 49 | Ex 50 | Ex 51 | Ex 52 | Ex 53 | Ex 54 | Ex 55 | Ex 56 | Ex 57 | Ex 58 | Ex 59 | Ex 60 |
|---|---|---|---|---|---|---|---|---|---|---|---|---|
| Polyester TPU (1) | — | — | — | — | — | — | — | — | — | — | — | — |
| Polyester TPU (2) | — | — | — | 60 | 57 | 57 | — | — | — | — | — | — |
| Polyester TPU (3) | — | — | — | — | — | — | — | — | — | — | — | — |
| Polyester TPU (4) | 60 | 57 | 57 | — | — | — | 60 | 57 | 57 | — | — | — |
| Polyester TPU (5) | — | — | — | — | — | — | — | — | — | — | 25 | 25 |
| Profax 6523 (6) | — | — | — | — | — | — | — | — | — | — | — | — |
| Rexene 41E2 (7) | 40 | 38 | 38 | 40 | 38 | 38 | 40 | 38 | 38 | 100 | 75 | 69 |
| Exxelor PO-1015 (8) | — | — | — | — | — | — | — | — | — | — | — | — |
| Bayon YM312 (9) | — | — | — | — | — | — | — | — | — | — | — | 5 |
| Hytrel 5544 (10) | — | — | — | — | — | — | — | — | — | — | — | — |
| Pebax MV 1074 (11) | — | — | — | — | — | — | — | — | — | — | — | — |
| Example 1 | — | — | — | — | — | — | — | — | — | — | — | — |
| Example 2 | — | — | — | — | — | — | — | — | — | — | — | — |
| Example 3 | — | — | — | — | — | — | — | — | — | — | — | — |
| Example 4 | — | — | 5 | — | 5 | — | — | 5 | — | — | — | — |
| Example 5 | — | — | — | — | — | — | — | — | — | — | — | — |
| Example 6 | — | — | — | — | — | — | — | — | — | — | — | — |
| Example 7 | — | — | — | — | — | — | — | — | — | — | — | — |

TABLE III-continued

|  | Ex 49 | Ex 50 | Ex 51 | Ex 52 | Ex 53 | Ex 54 | Ex 55 | Ex 56 | Ex 57 | Ex 58 | Ex 59 | Ex 60 |
|---|---|---|---|---|---|---|---|---|---|---|---|---|
| Example 8 | — | — | — | — | — | — | — | — | — | — | — | — |
| Example 9 | — | — | — | — | — | — | — | — | — | — | — | — |
| Example 10 | — | — | — | — | — | — | — | — | — | — | — | — |
| Example 11 | — | — | — | — | — | — | — | — | — | — | — | — |
| Example 12 | — | — | — | — | — | — | — | — | — | — | — | — |
| Example 13 | — | — | — | — | — | — | — | — | — | — | — | — |
| Example 14 | — | — | — | — | — | — | — | — | — | — | — | — |
| Example 15 | — | — | — | — | — | — | — | — | — | — | — | — |
| Example 16 | — | — | — | — | — | — | — | — | — | — | — | — |
| Example 17 | — | — | — | — | — | — | — | — | — | — | — | — |
| Example 18 | — | — | — | — | — | — | — | — | — | — | — | — |
| Example 19 | — | — | — | — | — | — | — | — | — | — | — | — |
| Example 20 | — | — | — | — | — | — | — | — | — | — | — | — |
| Example 21 | — | — | — | — | — | — | — | — | — | — | — | — |
| Example 22 | — | — | — | — | — | — | — | — | — | — | — | — |
| Example 23 | — | — | — | — | — | — | — | — | — | — | — | — |
| Example 24 | — | 5 | — | — | — | — | — | — | — | — | — | — |
| Comp Ex 1 | — | — | — | — | — | — | — | — | — | — | — | — |
| Kraton Liquid L-2203 | — | — | — | — | — | 5 | — | — | 5 | — | — | — |
| Properties |  |  |  |  |  |  |  |  |  |  |  |  |
| Izod, ft-lbs/inch | — | — | — | — | — | — | — | — | — | 0.94 | 1.51 | 2.1 |
| Flexural Modulus, psi | — | — | — | — | — | — | — | — | — | — | — | — |
| Tensile Strength, psi | 2855 | 2891 | 3733 | 1267 | 3121 | 1830 | 1528 | 1757 | 1097 | 5400 | 3150 | 3640 |
| Elongation, % | 471 | 508 | 525 | 29 | 289 | 13 | 14 | 147 | 7 | 16 | 11 | 81 |
| Tear Resistance, ft-lbs/inch | 436 | 338 | 549 | 731 | 821 | 366 | 545 | 742 | 428 | — | — | 927 |
| Taber Abrasion, g loss | 0.54 | 0.53 | 0.44 | — | — | — | — | — | — | — | — | — |
| Static decay +5,000 volts, sec | — | — | — | — | — | — | — | — | — | — | 0.4 | 0.11 |
| Static decay −5,000 volts, sec | — | — | — | — | — | — | — | — | — | — | 0.41 | 0.13 |
| Surface Resistivity, ohms | — | — | — | — | — | — | — | — | — | 3.4E+12 | 3.0E+11 | 1.2E+11 |
| Surface (12) | — | — | — | — | — | — | — | — | — | — | — | — |

(1) Poly(tetramethylene adipate) glycol with 59% hard segment
(2) Poly(tetramethyleneadipate) glycol with 45% hard segment
(3) Poly(tetramethylene ether) glycol with 62% hard segment
(4) Poly(tetramethylene ether) glycol with 43% hard segment
(5) Poly(oxyethylene) glycol with 36% hard segment
(6) Polypropylene homopolymer
(7) Polypropylene homopolymer
(8) Maleic anhydride functionalized polypropylene
(9) PEG-grafted acrylic copolymer
(10) Copolyester
(11) Copolyamide
(12) Surfaces of molded plaques were judged for delamination (del); v (very), sl (slight), sev (severe).

TABLE IV

|  | Ex 61 | Ex 62 | Ex 63 | Ex 64 | Ex 65 | Ex 66 | Ex 67 | Ex 68 | Ex 69 | Ex 70 | Ex 71 |
|---|---|---|---|---|---|---|---|---|---|---|---|
| Polyester TPU (1) | — | — | — | — | — | — | — | — | — | — | — |
| Polyester TPU (2) | — | — | — | — | — | — | — | — | — | — | — |
| Polyether TPU (3) | — | — | — | — | — | — | — | — | — | — | — |
| Polyether TPU (4) | — | — | — | — | — | — | — | — | — | — | — |
| Polyether TPU (5) | 25 | 25 | 25 | 25 | 25 | 25 | — | — | — | — | — |
| Profax 6523 (6) | — | — | — | — | — | — | — | — | — | — | — |
| Rexene 41E2 (7) | 69 | 69 | 69 | 69 | 69 | 69 | — | — | — | — | — |
| Exxelor PO-1015 (8) | — | — | — | — | — | — | — | — | — | — | — |
| Bayon YM312 (9) | 5 | 5 | 5 | 5 | 5 | 5 | — | — | — | — | — |
| Hytret 5544 (10) | — | — | — | — | — | — | — | 25 | 25 | — | — |
| Pebax MV 1074 (11) | — | — | — | — | — | — | — | — | — | 25 | 25 |
| Example 1 | — | — | — | — | — | — | — | — | — | — | — |
| Example 2 | — | — | — | — | — | — | — | — | — | — | — |
| Example 3 | — | — | — | — | — | — | — | — | — | — | — |
| Example 4 | — | — | — | — | — | — | — | — | — | — | — |
| Example 5 | — | — | — | — | — | — | — | — | — | — | — |
| Example 6 | — | — | — | — | — | — | — | — | — | — | — |
| Example 7 | — | — | — | — | — | — | — | — | — | — | — |
| Example 8 | — | — | — | — | — | — | — | — | — | — | — |
| Example 9 | — | — | — | — | — | — | — | — | — | — | — |
| Example 10 | — | — | — | — | — | — | — | — | — | — | — |
| Example 11 | — | — | — | — | — | — | — | — | — | — | — |
| Example 12 | — | — | — | — | — | — | — | — | — | — | — |

TABLE IV-continued

|  | Ex 61 | Ex 62 | Ex 63 | Ex 64 | Ex 65 | Ex 66 | Ex 67 | Ex 68 | Ex 69 | Ex 70 | Ex 71 |
|---|---|---|---|---|---|---|---|---|---|---|---|
| Example 13 | — | — | — | — | — | — | — | — | — | — | — |
| Example 14 | — | — | — | — | — | — | — | — | — | — | — |
| Example 15 | — | — | — | — | — | — | — | — | — | — | — |
| Example 16 | — | — | — | — | — | — | — | — | — | — | — |
| Example 17 | — | — | — | — | — | — | — | — | — | — | — |
| Example 18 | 1 | — | — | — | — | — | — | — | — | — | — |
| Example 19 | — | 1 | — | — | — | — | — | — | — | — | — |
| Example 20 | — | — | 1 | — | — | — | — | — | — | — | — |
| Example 21 | — | — | — | 1 | — | — | — | — | — | — | — |
| Example 22 | — | — | — | — | 1 | — | — | — | — | — | — |
| Example 23 | — | — | — | — | — | 1 | — | — | — | — | — |
| Example 24 | — | — | — | — | — | — | 1 | — | 1 | — | — |
| Comp Ex 1 | — | — | — | — | — | — | — | — | — | — | 1 |
| Kraton Liquid L-2203 | — | — | — | — | — | — | — | — | — | — | — |
| Properties | — | — | — | — | — | — | — | — | — | — | — |
| Izod, ft-lbs/inch | 12.3 | 12.9 | 7.7 | 6.28 | 7.09 | 6.45 | — | — | — | — | — |
| Flexural Modulus, psi | — | — | — | — | — | — | — | — | — | — | — |
| Tensile Strengh, psi | 3620 | 3680 | 3730 | 3880 | 3790 | 3830 | 3720 | 4200 | 4220 | 4260 | 4290 |
| Elongation, % | 200 | 233 | 295 | 227 | 189 | 238 | 325 | 94 | 146 | 111 | 155 |
| Tear Resistance, ft-lbs/inch | 1118 | 1102 | 1008 | 1119 | 1106 | 1059 | — | — | — | — | — |
| Taber Abrasion, g loss | — | — | — | — | — | — | — | — | — | — | — |
| Static decay +5,000 volts, sec | 0.15 | 0.17 | 0.13 | 0.13 | 0.13 | 0.13 | — | — | — | — | — |
| Static decay −5,000 volts, sec | 0.18 | 0.18 | 0.14 | 0.14 | 0.15 | 0.14 | — | — | — | — | — |
| Surface Resistivity, ohms | 1.6E+11 | 1.9E+11 | 7.8E+10 | 2.3E+11 | 2.2E+11 | 1.9E+11 | — | — | — | — | — |
| Surface (12) | — | — | — | — | — | — | — | — | — | — | — |

(1) Poly(tetramethylene adipate) glycol with 59% hard segment
(2) Poly(tetramethyleneadipate) glycol with 45% hard segment
(3) Poly(tetramethylene ether) glycol with 62% hard segment
(4) Poly(tetramethylene ether) glycol with 43% hard segment
(5) Poly(oxyethylene) glycol with 36% hard segment
(6) Polypropylene homopolymer
(7) Polypropylene homopolymer
(8) Maleic anhydride functionalized polypropylene
(9) PEG-grafted acrylic copolymer
(10) Copolyester
(11) Copolyamide
(12) Surfaces of molded plaques were judged for delamination (del), v (very), sl (slight), sev (severe).

As apparent from the examples, good properties such as impact resistance, tear resistance, good abrasion resistance, and the like were obtained indicating good compatibilization of the blend of thermoplastic polyurethane and polypropylene. Moreover, good static decay properties were also obtained.

While in accordance with the patent statutes the best mode and preferred embodiment has been set forth, the scope of the invention is not limited thereto, but rather by the scope of the attached claims.

What is claimed is:

1. A process for forming a compatibilized blend of a thermoplastic elastomer and a polyolefin, comprising steps of:
   heating the thermoplastic elastomer and polyolefin in the presence of a compabilizing agent to a temperature above the melting point of said thermoplastic elastomer and said polyolefin; and
   mixing the heated thermoplastic elastomer, polyoletin, and compatibilizing agent to form a blend;
   wherein said compatibilizing agent is a thermoplastic polyurethane derived from a reaction of a diisocyanate, a chain extender, and a hydrocarbon polymer having a number average molecular weight of not greater than 10,000 and having isocyanate-reactive functional groups, wherein said hydrocarbon polymer contains a solely hydrocarbon chain between said functional groups, wherein said hydrocarbon polymer is derived from one or more dienes having a total of from 4 to 8 carbon atoms, and wherein said hydrocarbon polymer has isocyanate-reactive functional groups selected from a group consisting of amines and hydroxyls: wherein said chain extender is selected from a group consisting of diamines, alkanolamines, and diols, wherein said diols have a total of from 2 to 15 carbon atoms; wherein the compatibilizing agent has hard segments and soft segments, wherein the compatibilizing agent is at least 25 percent by weight based upon the total weight of the compatibilizing agent soft segments, and wherein said hard segments result from reactions of the diisocyanate and the isocyanate-reactive functional groups or from reactions of the diisocyanate and the chain extender.

2. A process for forming a compatibilized blend of a thermoplastic elastomer and a polyolefin according to claim 1, wherein the amount of said thermoplastic elastomer is from about 5 percent to about 95 percent by weight and wherein the amount of said polyolefin is from about 95 to about 5 percent by weight based upon the total weight of said thermoplastic elastomer and said polyolefin, and
   wherein the amount of said compatibilizing agent is from about 0.25 to about 15 parts by weight per 100 parts by total weight of said thermoplastic elastomer and said polyolefin.

3. A process for forming a compatibilized blend of a thermoplastic elastomer and a polyolefin according to claim 1, wherein said thermoplastic elastomer is selected from a group consisting of a thermoplastic polyester elastomer, a thermoplastic polyamide elastomer, a thermoplastic urethane polymer, or combinations thereof, and wherein said diisocyanate has a total of from about 2 to about 30 carbon atoms.

4. A process for forming a compatibilized blend of a thermoplastic elastomer and a polyolefin according to claim 1, wherein said thermoplastic elastomer has a weight average molecular weight of from about 20,000 to about 500,000, wherein said polyolefin has a weight average molecular weight of from about 40,000 to about 2,000,000 and wherein the molar ratio of isocyanate groups of said diisocyanate to isocyanate-reactive functional groups of the chain extender and the hydrocarbon polymer is from about 0.80 to about 1.05.

5. A process for forming a compatibilized blend of a thermoplastic elastomer and a polyolefin according to claim 1, wherein the amount of said polyolefin is from about 85 percent to about 40 percent by weight of the total weight of the polyolefin and the thermoplastic elastomer and wherein the amount of said thermoplastic elastomer is from about 15 to about 60 percent by weight of the total weight of the polyolefin and the thermoplastic elastomer, and wherein said compatibilizing agent contains from about 45 to about 90 percent by weight soft segments.

6. A process for forming a compatibilized blend of a thermoplastic elastomer and a polyolefin according to claim 1, wherein said mixing is performed at a temperature from about 180° C. to about 240° C., and wherein said hydrocarbon polymer is derived from butadiene.

7. A process for forming a compatibilized blend of a thermoplastic elastomer and a polyolefin according to claim 1, wherein said thermoplastic elastomer is a urethane polymer, wherein the amount of said compatibilizing agent is from about 0.5 to about 6 parts by weight for every 100 parts by total weight of the thermoplastic elastomer and the polyolefin, wherein said diisocyanate is methylene bis-(4-phenylisocyanate), wherein said chain extender is selected from a group consisting of 2-butyl-2-ethyl-1,3-propane diol, neopentyl glycol, and combinations thereof, wherein the molar ratio of said isocyanate groups to the isocyanate-reactive functional groups of the chain extender and the hydrocarbon polymer is about 0.9 to about 1.01, wherein said polyolefin is polypropylene, and wherein said hydrocarbon polymer is derived from butadiene.

8. A compatibilized blend of a thermoplastic elastomer and a polyolefin, comprising:

from about 5 to about 95 percent by weight of the thermoplastic elastomer and from about 95 to about 5 percent by weight of the polyolefin based upon the total weight of said thermoplastic elastomer and said polyolefin, and an effective amount of a compatibilizing agent to compatibilize said thermoplastic elastomer and said polyolefin, said compatibilizing agent being a thermoplastic polyurethane derived from a reaction of a diisocyanate, a chain extender, and a hydrocarbon polymer having a number average molecular weight of not greater than 10,000 and having isocyanate-reactive functional groups, wherein said hydrocarbon polymer contains a solely hydrocarbon chain between said functional groups, wherein said hydrocarbon polymer is derived from one or more dienes having a total of from 4 to 8 carbon atoms, and wherein said hydrocarbon polymer has isocyanate-reactive functional groups selected from a group consisting of hydroxyls and amines; wherein said chain extender is selected from a group consisting of diamines, alkanolamines, and diols, wherein said diols have a total of from 2 to 15 carbon atoms; wherein the compalibilizing agent has hard segments and soft segments, wherein the compatibilizing agent is at least 25 percent by weight based upon the total weight of the compatibilizing agent soft segments, and wherein said hard segments result from reactions of the diisocyanate and the isocyanate-reactive functional groups or from reactions of the diisoyanate and the chain extender.

9. A compatibilized blend according to claim 8, wherein the molar ratio of isocyanate groups of said diisocyanate to the isocyanate-reactive functional groups of said chain extender and said hydrocarbon polymer is from about 0.8 to about 1.05.

10. A compatibilized blend according to claim 8, wherein an effective amount of said compatibilizing agent is from about 0.25 to about 15 parts by weight per 100 parts by total weight of said thermoplastic elastomer and said polyolefin, and wherein said compatibilizing agent is at least 35 percent by weight based upon the total weight of the compatibilizing agent soft segments.

11. A compatibilized blend according to claim 8, wherein said thermoplastic elastomer is selected from a group consisting of a thermoplastic polyester elastomer, a thermoplastic polyamide elastomer, and a thermoplastic urethane polymer, wherein said urethane polymer is derived from a polyester polyol, a polyether polyol, or combinations thereof; and wherein said polyolefin is polypropylene.

12. A compatibilized blend according to claim 8, wherein said diisocyanate is methylene bis-(4-phenylisocyanate), and wherein said chain extender is selected from a group consisting of neopentyl glycol, 2-butyl-2-ethyl-1,3-propane diol, and combinations thereof.

13. A compatibilized blend according to claim 1, wherein the thermoplastic elastomer is a urethane polymer and said urethane polymer is present in an amount from about 15 to about 60 percent by weight based upon the total weight of said thermoplastic elastomer and said polyolefin; wherein the polvolefin is polypropylene, and said polyolefin is present in an amount of from about 40 to about 85 percent by weight based upon the total weight of said thermoplastic elastomer and said polyolefin, and wherein the amount of said compatibilizing agent is from about 0.50 part to about 6 parts by weight, and wherein said molar ratio of said isocyanate groups of said diisocyanate to said isocyanate-reactive functional groups is from about 0.9 to about 1.01.

14. A compatibilized blend according to claim 8, wherein said thermoplastic elastomer is a thermoplastic urethane polymer and is present in an amount of from about 15 to about 60 percent by weight based upon the total weight of said thermoplastic elastomer and said polyolefin, wherein said polyolefin is polypropylene and is present in an amount of from about 40 percent to about 85 percent by weight based upon the total weight of said thermoplastic elastomer and said polyolefin; and wherein said compatibilizing agent has from about 45 to about 90 percent by weight of the compatibilizinp agent of soft segments, and wherein the compatibilizing, agent is present in an amount of from about 0.5 to about 6 parts by weight for every 100 parts by total weight of the thermoplastic elastomer and the polyolefin, wherein the diisocyanate is methylene bis-(4-phenylisocyanate), and wherein the chain extender is selected from a group consisting of 2-butyl-2-ethyl-1,3- propane diol, neopentyl plycol, and combinations thereof; and wherein the molar ratio of said isocyanate groups to the isocyanate-reactive functional groups of the chain extender and the hydrocarbon polymer is about 0.9 to about 1.01; and wherein said hydrocarbon polymer is derived from butadiene.

15. A process for forming a compatibilized blend of a thermoplastic elastomer and a polyolefin, comprising steps of:

heating the thermoplastic elastomer and polyolefin in the presence of at compatibilizing agent a temperature above the melting point of said thermoplastic elastomer and said polyolefin; and mixing said heated thermoplastic elastomer polyolefin, and compatibilizing agent to form a blend;

wherein said compatibilizing agent is a thermoplastic polyurethane derived from a reaction of a diisocyanate, a chain extender, and a polymer having isocyanate-reactive functional groups selected from a group consisting of hydroxyls and amines therein and having at least 20 consecutive carbon atoms in its backbone chain between any non-carbon atoms and a number average molecular weight of not greater than 10,000; wherein the chain extender is selected from a group consisting of diamines, alkanolamines, and diols, wherein said diols have a total of from 2 to 15 carbon atoms; wherein the compatibilizing agent has hard segments and soft segments; wherein the compatibilizing agent is at least 25 percent by weight based upon the total weight of the compatibilizing agent soft segments, and wherein said hard segments result from reactions of the diisocyanate and the isocyanate-reactive functional groups or from reactions of the diisocyanate and the chain extender.

16. A process for forming a compatibilized blend of a thermoplastic elastomer and a polyolefin according to claim 15, wherein the amount of said thermoplastic elastomer is from about 5 percent to about 95 percent by weight based upon the total weight of said thermoplastic elastomer and said polyolefin, wherein the amount of said polyolefin is from about 95 percent by weight to about 5 percent by weight based upon the total weight of said thermoplastic elastomer and said polyolefin, and wherein the amount of said compatibilizing agent is from about 0.25 to about 15 parts by weight per 100 parts by weight based upon the total weight of said thermoplastic elastomer and said polyolefin.

17. A process for forming a compatibilized blend of a thermoplastic elastomer and a polyolefin according to claim 15, wherein said thermoplastic elastomer is selected from a group consisting of a thermoplastic polyester elastomer, a thermoplastic polyamide elastomer, a thermoplastic urethane polymer, and combinations thereof and wherein said diisocyanate has a total of from about 2 to about 30 carbon atoms.

18. A process for forming a compatibilized blend of a thermoplastic elastomer and a polyolefin according to claim 15, wherein said thermoplastic elastomer has a weight average molecular weight of from about 20,000 to about 500,000, wherein said polyolefin has a weight average molecular weight of from about 40,000 to about 2,000,000; wherein the polymer having isocyanate-reactive functional groups therein has at least 30 consecutive carbon atoms in its backbone chain between any non-carbon atoms; and wherein the molar ratio of isocyanate groups of said diisocyanate to isocyanate-reactive functional groups of the chain extender and the polymer is from about 0.80 to about 1.05.

19. A process for forming a compatibilized blend of a thermoplastic elastomer and a polyolefin according to claim 15, wherein the amount of said polyolefin is from about 85 percent to about 40 percent by weight of the total weight of the polyolefin and the thermoplastic elastomer and wherein the amount of said thermoplastic elastomer is from about 15 to about 60 percent by weight of the total weight of the polyolefin and the thermoplastic elastomer, and wherein said compatibilizing agent contains from about 45 to about 90 percent by weight soft segments.

20. A process for forming a compatibilized blend of a thermoplastic elastomer and a polyolefin according to claim 15, wherein said mixing is performed at a temperature from about 180° C. to about 240° C., and wherein said polymer having isocyanate-reactive functional groups therein is a dimerdiol having at least 36 consecutive carbon atoms between any non-carbon atoms in its backbone chain.

21. A process for forming a compatibilized blend of a thermoplastic elastomer and a polyolefin according to claim 15, wherein said thermoplastic elastomer is a urethane polymer and said thermoplastic elastomer is present in an amount of about 15 percent by weight to about 60 percent by weight based upon the total weight of the thermoplastic elastomer and the polyolefin; wherein said polyolefin is polypropylene and said polyolefin is present in an amount of about 85 percent by weight to about 40 percent by weight based upon the total weight of the thermoplastic elastomer and the polyolefin; and wherein the amount of said compatibilizing agent is from about 0.5 to about 6 parts by weight for every 100 parts by total weight of the thermoplastic elastomer and the polyolefin, wherein said diisocyanate is methylene bis-(4-phenylisocyanate), wherein said chain extender is selected from a group consisting of 2-butyl-2-ethyl-1,3-propane diol, neopentyl glycol, and combinations thereof, wherein the molar ratio of said isocyanate groups to the isocyanate-reactive functional groups of the chain extender and the polymer having isocyanate-reactive functional groups therein is about 0.9 to about 1.01, and wherein the polymer having isocyanate-reactive functional groups therein is a dimerdiol dimerate prepared from a dimerdiol having at least 36 consecutive carbon atoms in its backbone chain between any non-carbon atoms and a dimer acid having at least 44 carbon atoms in its backbone chain between any non-carbon atoms.

22. A compatibilized blend of a thermoplastic elastomer and a polyolefin, comprising:

from about 5 to about 95 percent by weight of the thermoplastic elastomer and from about 95 percent to about 5 percent by weight of the polyolefin based upon the total weight of said thermoplastic elastomer and said polyolefin, and an effective amount of a compatibilizing agent to compatibilize said thermoplastic elastomer and said polyolefin, said compatibilizing agent being a thermoplastic polyurethane derived from a reaction of a diisocyanate, a chain extender, and a polymer having isocyanate-reactive functional groups selected from a group consisting of hydroxyls and amines therein and having at least 20 consecutive carbon atoms in its backbone chain between any non-carbon atoms and a number average molecular weight of not greater than 10,000; wherein the chain extender is selected from a group consisting of diamines, alkanolamines, and diols, wherein said diols have a total of from 2 to 15 carbon atoms; wherein the compatibilizing agent has hard segments and soft segments; wherein the compatibilizing agent is at least 25 percent by weight based upon the total weight of the compatibilizing agent soft segments, and wherein said hard segments result from reactions of the diisocyanate and the isocyanate-reactive functional groups or from reactions of the diisocyanate and the chain extender.

23. A compatibilized blend according to claim 22, wherein the molar ratio of isocyanate groups of said diisocyanate to the isocyanate-reactive functional groups of said chain extender and said polymer having isocyanate-reactive functional groups therein is from about 0.8 to about 1.05.

24. A compatibilized blend according to claim 22, wherein an effective amount of said compatibilizing agent is from about 0.25 to about 15 parts by weight per 100 parts by total weight of said thermoplastic elastomer and said polyolefin, and wherein said compatibilizing agent is at least 35 percent by weight based upon the total weight of the compatibilizing agent soft segments.

25. A compatibilized blend according to claim 22, wherein said thermoplastic elastomer is selected from a group consisting of a thermoplastic polyester elastomer, a thermoplastic polyamide elastomer, and a thermoplastic urethane polymer, wherein said urethane polymer is derived from a polyester polyol, a polyether polyol, or combinations thereof, and wherein said polyolefin is polypropylene.

26. A compatibilized blend according to claim 22, wherein said diisocyanate is methylene bis-(4-phenylisocyanate), and wherein said chain extender is selected from a group consisting of neopentyl glycol, 2-butyl-2-ethyl-1,3-propane diol, and combinations thereof.

27. A compatibilized blend according to claim 22, wherein the thermoplastic elastomer is a urethane polymer and said urethane polymer is present in an amount from about 15 to about 60 percent by weight based upon the total weight of said thermoplastic elastomer and said polyolefin; wherein the polyolefin is polypropylene, and said polyolefin is present in an amount of from about 40 percent to about 85 percent by weight based upon the total weight of said thermoplastic elastomer and said polyolefin, and wherein the amount of said compatibilizing agent is from about 0.50 part to about 6 parts by weight, and wherein said molar ratio of said isocyanate groups of said diisocyanate to said isocyanate-reactive functional groups is from about 0.9 to about 1.01.

28. A compatibilized blend according to claim 22, wherein said thermoplastic elastomer is a thermoplastic urethane polymer and is present in an amount of from about 15 to about 60 percent by weight based upon the total weight of said thermoplastic elastomer and said polyolefin, wherein said polyolefin is polypropylene and is present in an amount of from about 40 percent to about 85 percent by weight based upon the total weight of said thermoplastic elastomer and said polyolefin; and wherein said compatibilizing agent has from about 45 percent to about 90 percent by weight of the compatibilizing agent soft segments, and wherein the compatibilizing agent is present in an amount of from about 0.5 part to about 6 parts by weight for every 100 parts by total weight of the thermoplastic elastomer and the polyolefin, wherein the diisocyanate is methylene bis-(4-phenylisocyanate), and wherein the chain extender is selected from a group consisting of 2-butyl-2-ethyl-1,3-propane diol, neopentyl glycol, and combinations thereof; and wherein the molar ratio of said isocyanate groups to the isocyanate-reactive functional groups of the chain extender and the polymer having isocyanate-reactive functional groups therein is about 0.9 to about 1.01; and wherein said polymer having isocyanate-reactive functional groups therein is a dimerdiol dimerate prepared from a dimerdiol containing at least 36 carbon atoms and a timer acid containing about 44 carbon atoms.

* * * * *